(12) United States Patent
Namineni et al.

(10) Patent No.: US 7,852,262 B2
(45) Date of Patent: Dec. 14, 2010

(54) WIRELESS MOBILE INDOOR/OUTDOOR TRACKING SYSTEM

(75) Inventors: Pavan K. Namineni, Ann Arbor, MI (US); Trevor Davey, South Lyon, MI (US); Gary Siebert, Ann Arbor, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 191 days.

(21) Appl. No.: 12/192,414

(22) Filed: Aug. 15, 2008

(65) Prior Publication Data

US 2009/0046005 A1  Feb. 19, 2009

Related U.S. Application Data

(60) Provisional application No. 60/956,262, filed on Aug. 16, 2007.

(51) Int. Cl.
*G01S 19/45* (2010.01)
*G01S 19/46* (2010.01)

(52) U.S. Cl. .............. 342/357.28; 342/357.29

(58) Field of Classification Search ............ 342/357.07, 342/357.28, 357.29
See application file for complete search history.

(56) References Cited

U.S. PATENT DOCUMENTS

| | | | |
|---|---|---|---|
| 4,884,208 A | 11/1989 | Marinelli et al. | |
| 5,225,842 A | 7/1993 | Brown et al. | |
| 5,365,516 A | 11/1994 | Jandrell | |
| 5,977,913 A | 11/1999 | Christ | |
| 5,987,011 A | 11/1999 | Toh et al. | |
| 6,204,813 B1 | 3/2001 | Wadell et al. | |
| 6,459,989 B1* | 10/2002 | Kirkpatrick et al. | 701/215 |
| 6,529,164 B1 | 3/2003 | Carter | |
| 6,674,403 B2 | 1/2004 | Gray et al. | |
| 6,720,922 B2 | 4/2004 | Williams et al. | |
| 7,031,725 B2 | 4/2006 | Rorabaugh | |
| 7,038,584 B2 | 5/2006 | Carter | |
| 7,050,819 B2 | 5/2006 | Schwengler et al. | |
| 7,321,774 B1* | 1/2008 | Lau et al. | 455/456.1 |
| 2002/0105436 A1* | 8/2002 | Bell et al. | 340/870.17 |
| 2003/0109988 A1* | 6/2003 | Geissler et al. | 701/213 |
| 2005/0046580 A1* | 3/2005 | Miranda-Knapp et al. | 340/686.1 |
| 2006/0023686 A1* | 2/2006 | Jeong et al. | 370/338 |
| 2009/0147778 A1* | 6/2009 | Wanless et al. | 370/389 |
| 2010/0120422 A1* | 5/2010 | Cheung et al. | 455/434 |

* cited by examiner

*Primary Examiner*—Thomas H Tarcza
*Assistant Examiner*—Harry Liu
(74) *Attorney, Agent, or Firm*—Gifford, Krass Sprinkle, Anderson & Citkowski, P.C.

(57) ABSTRACT

This invention is a wireless mobile indoor/outdoor tracking system. It is designed to track the absolute position of all nodes in a network indoors and outdoors. The system uses GPS positioning when a signal is available and RF ranging when it is unavailable. When indoors, a minimum of three network nodes must receive a GPS signal to determine absolute position. A mesh network is used to make the system mobile and to create an avenue for data to be transmitted to a remote base station.

5 Claims, 2 Drawing Sheets

WIRELESS MOBILE INDOOR/OUTDOOR TRACKING SYSTEM

REFERENCE TO RELATED APPLICATION

This application claims priority from U.S. Provisional Patent Application Ser. No. 60/956,262, filed Aug. 16, 2007, the entire content of which is incorporated herein by reference.

GOVERNMENT SUPPORT

This invention was made with Government support under Contract No. DACA42-03-C-0014 awarded by the United States Army. The Government has certain rights in the invention.

FIELD OF THE INVENTION

This application relates generally to monitoring the movements of mobile devices or beings and, more particularly, to a system for determining the position of a moving body indoors or outdoors within a wireless mobile network.

BACKGROUND OF THE INVENTION

There are many systems that are designed to track the movement of an object or being. The field may be segmented into (a) systems that track movement outdoors, (b) systems that track movement indoors, and (c) systems that track movement indoors as well as outdoors. U.S. Pat. No. 5,225,842 is an example of the first case; U.S. Pat. No. 7,038,584 is an example of the second case; and U.S. Pat. No. 6,459,989 is an example of the third case.

Position tracking using GPS is a proven technology that works depending on the availability of positioning satellites. It fails when the device being tracked loses the satellite signals (i.e. enters a building or structure). Because of this failure an indoor positioning method must be used when in a GPS occluded environment.

Indoor tracking using RF technology is done in two different ways, timing (as described in U.S. Pat. No. 6,459,989) and received signal strength (as described in U.S. Pat. No. 6,720,922). Both of these technologies are dependent upon other RF nodes in the network and can only determine relative position between each other.

For indoor tracking to determine absolute position, at least three nodes in the network must have a known position. This problem has normally been solved by putting fixed position nodes indoors (as described in U.S. Pat. No. 5,977,913) or outdoors within range of the network (as described in U.S. Pat. No. 6,459,989). These solutions limit the range and mobility of the positioning system and require setup preparation before the system can be used to determine absolute position.

Mobile networking has become a practical solution with the development of Mobile Ad Hoc Networks (MANETs) and mesh networks (as described in U.S. Pat. No. 5,987,011). This type of networking can be used to create free roaming positioning systems with positioning communication.

As is apparent from above, no complete solution for a wireless mobile indoor/outdoor positioning system has been designed. While mobile outdoor positioning systems (as described in U.S. Pat. No. 7,050,819) and fixed indoor/outdoor positioning systems (as described in U.S. Pat. No. 6,459,989), have been developed, combining network mobility with indoor positioning to determine absolute position is undeveloped and the basis of this patent application.

SUMMARY OF THE INVENTION

This invention is a wireless mobile indoor/outdoor tracking system. It is designed to track the absolute position of all nodes in a network indoors and outdoors. The system uses GPS positioning when a signal is available and RF ranging when it is unavailable. When indoors, a minimum of three network nodes must receive a GPS signal to determine absolute position. A mesh network is used to make the system mobile and to create an avenue for data to be transmitted to a remote base station.

The system is also designed to provide a position stamp to sensor data in the network. Each node can interface with a sensor module and this data can be collected by the node and tagged with its position. The combined data is then transmitted through the mesh network for analysis.

The system is also designed to provide data to a sensor module in the network. Each node can interface with a sensor module and data can be provided based on location.

A Geo Telemetry Unit (GTU) will represent each node in the network. It contains a GPS receiver, RF transceiver, and a serial interface. The GPS receiver provides absolute and outdoor positioning to the system. The RF transceiver provides indoor positioning and networking capabilities to pass sensor and positioning data. The serial interface provides a connection to a sensor module to collect or provide data, or a computer to off load data.

The system is not fixed and requires a minimum of four GTUs to operate. Each GTU is self configuring as it uses the availability of a GPS signal to determine if RF ranging is necessary. When in RF ranging mode, a minimum of three GTUs with known position will be used as reference points to determine absolute position.

DETAILED DESCRIPTION OF THE INVENTION

This invention broadly provides indoor and outdoor positioning information to a remote location using a plurality of self-contained electronic modules called Geo Telemetry Units (GTUs). A GTU is placed on a person, vehicle, or object to be tracked, and others are placed on other persons, vehicles, or objects in a mesh network. The networked GTUs move inside and outside of a building or other structure to provide reference points and communication relays for the persons, vehicles, or objects that are being tracked.

As the GTUs move inside and outside of a building or other structure, each one determines which of its capabilities are operative. If it can receive GPS, it obtains a location fix and communicates it to other nodes via the wireless mesh network. If it cannot receive GPS, it will assume it is within a structure and attempt communication with other GTUs for position determination using RF ranging. The system can determine range between outside GTUs (that have GPS) and inside GTUs (that do not have GPS) and the range between the indoor GTUs as well. Ranging information is communicated among the indoor GTUs in order to provide position information to a remote location.

Figure 1:
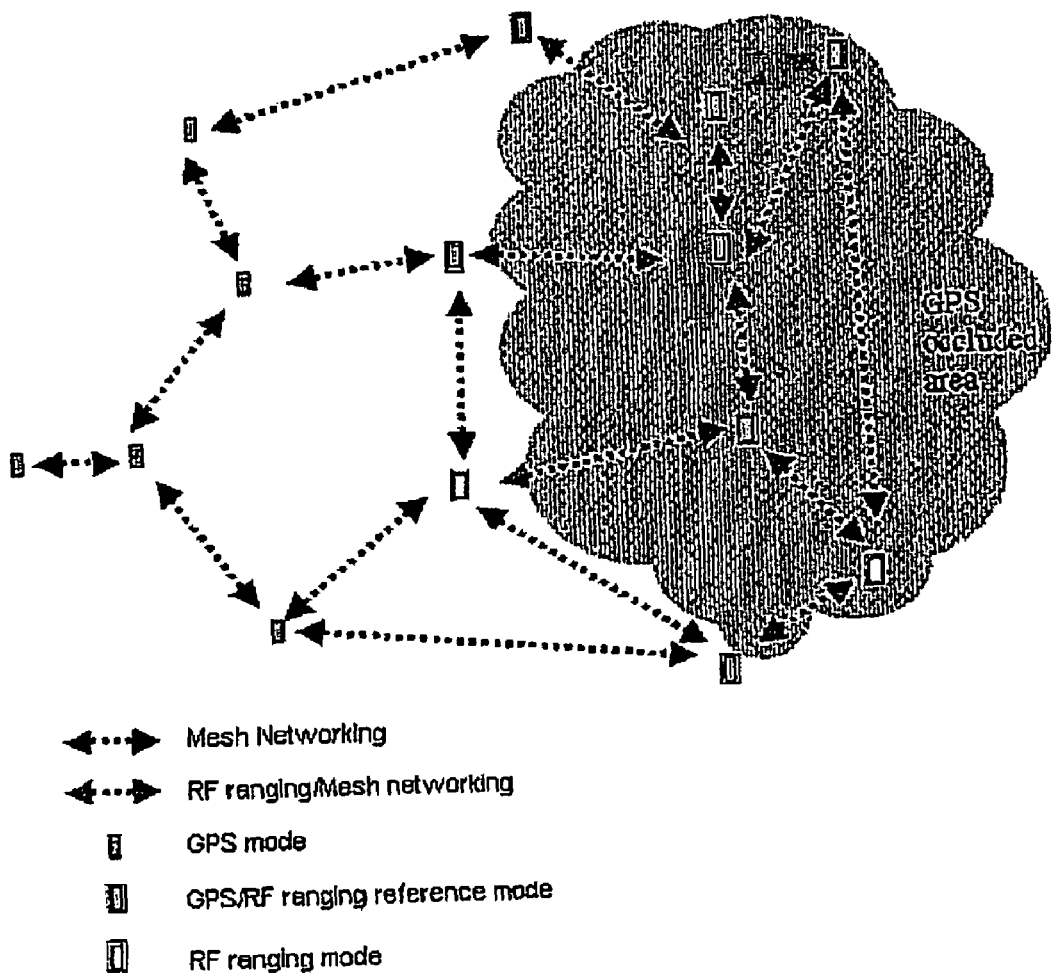
FIG. 1 shows an overall view of the present invention.
Figure 2:
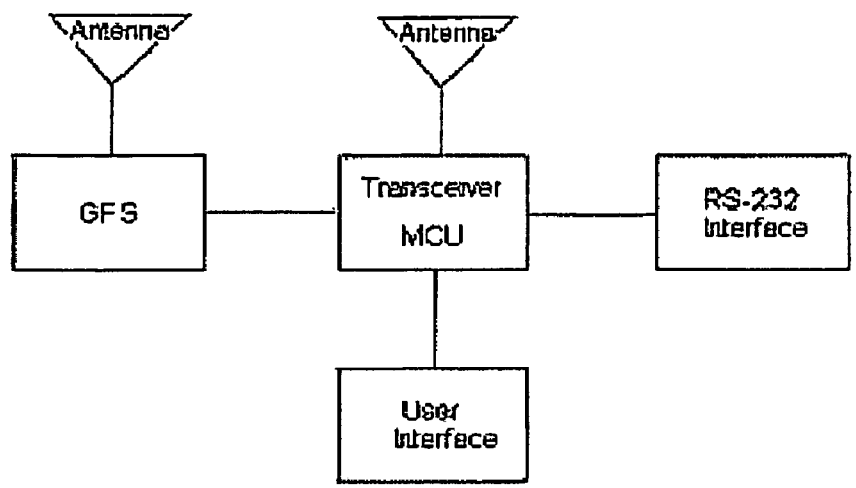
FIG. 2 is a block diagram of the Geo Telemetry Unit.
Figure 3:
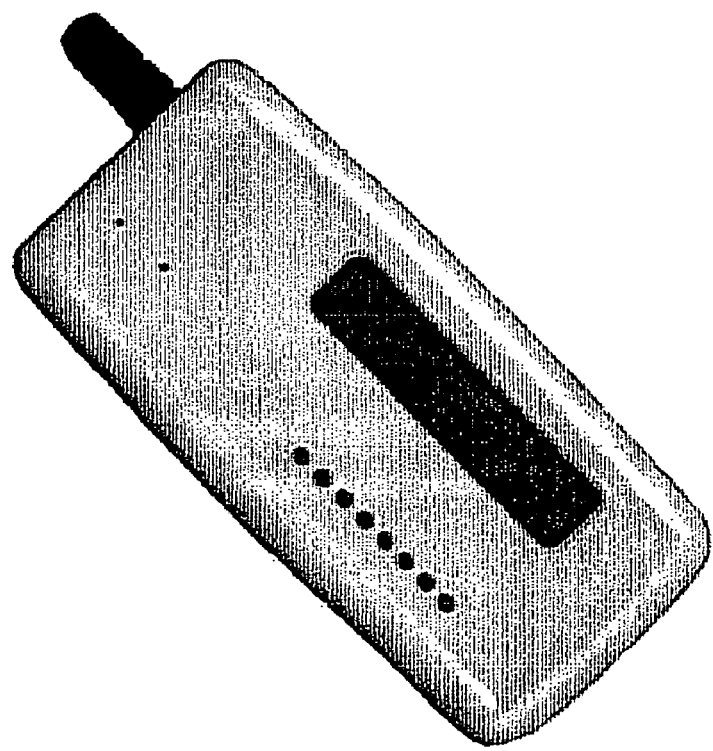
FIG. 3 is a picture of the Geo Telemetry Unit.

Referring to FIG. 1, a person, vehicle, or object would be position-aware until entering the GPS occluded area. At that point, position aware GTUs would provide reference and communication channels to monitor position. As the person, vehicle, or object moves further, other GTUs will be used to relay out of range information back to a base station, which has a known location. If a mesh of GTUs is established, they can readily identify the position of any GTU anywhere inside an occluded area or building.

Utilizing a reference node with a known position, the GTU will determine the signal strength and then convert it to distance. If there is a minimum of three reference nodes, the GTU can determine its position indoors.

Reference GTUs are not limited to receiving GPS data. A reference GTU can be any GTU that knows its position and is part of the network. For example, a GTU that utilizes RF ranging to determine its position can then be used as a reference for another GTU with an unknown position.

The mesh network is utilized to provide mobility to the system. It allows for continuous communication no matter how the network is formed or changed. The network will reconfigure itself around broken or blocked paths until the destination is reached. The only requirement is that a node is within range of one other node in the network.

The mesh network is also utilized to route data out of dense structures. Communication is commonly lost when entering buildings and current solutions include increasing power. Increasing power will increase the size and significantly reduce the life of a GTU. The mesh network requires less power because it is not trying to transmit out of a building, but just to the next router or GTU.

To support this application, each GTU has the following features:
1. A GPS receiver
2. A RF transceiver
3. A serial interface
4. Portability Each GTU is equipped with a GPS receiver. It will be used to provide absolute position data outdoors. This position data is used to determine a reference point for indoor positioning.

Each GTU is equipped with a RE transceiver that is used for RF ranging and mesh networking. RF ranging is used to determine absolute position based on received signal strength from three other GTUs with a known location. The mesh networking is used to provide mobility to the network and a low power solution to routing the position data.

Each GTU is equipped with a serial interface that is used to collect data from a sensor module, supply data to a sensor module, or connect to a computer as a base station. The data collected from the sensor module can be collected by the GTU and stamp with the location of where the data was collected. In reverse, data can be supplied to the sensor module based on its location. The GTU can also connect to a computer and act as a base station or bridge between the network and the computer application.

Each GTU is battery powered with small non-invasive packaging. They use a PCB antenna for RF communication and a small active antenna for GPS communication, which eliminates the awkwardness of a large external antenna.

Having described our invention, we claim:

1. A indoor/outdoor positioning system, comprising:
 a plurality of geo telemetry units (GTUs), each GTU containing:
  a global positioning system (GPS) satellite receiver, a
  a radio-frequency (RF) transceiver, and
  a microcontroller (MCU) in electronic communication with the GPS receiver and RF transceiver, each MCU being operative to perform the following functions:
   (a) automatically determine the absolute position of the GTU based upon GPS if GPS signals are available;
   (b) if GPS signals are not available, automatically communicating with other GTUs to determine its position relative to at least three other GTUs using RF ranging; and
   (c) automatically communicate its location to other GTUs, regardless of whether position was determined through GPS or RF ranging.

2. The indoor/outdoor positioning system of claim 1, wherein each GTU is a self-contained, battery-operated mobile device.

3. The indoor/outdoor positioning system of claim 1, including a GTU with a sensor module to collect and communicate data to other GTUs.

4. The indoor/outdoor positioning system of claim 1, wherein the GTUs form a mesh network.

5. The indoor/outdoor positioning system of claim 1, wherein position is determined relative to other GTUs using RF ranging based upon signal strength.

* * * * *